US010323144B2

(12) United States Patent
Orts et al.

(10) Patent No.: US 10,323,144 B2
(45) Date of Patent: Jun. 18, 2019

(54) BIODEGRABLE CARDSTOCK COMPOSITION

(71) Applicants: The United States of America, as represented by the Secretary of Agriculture, Washington, DC (US); LAPOL LLC, Santa Barbara, CA (US); NATURAL SOLUTIONS, Grand Rapids, MI (US)

(72) Inventors: William J. Orts, Burlingame, CA (US); Allison Flynn, El Cerrito, CA (US); Lennard F. Torres, Dublin, CA (US); William E. Kelly, Grand Rapids, MI (US)

(73) Assignees: The United States of America, as represented by The Secretary of Agriculture, Washington, DC (US); Lapol, LLC, Santa Barbara, CA (US)

(*) Notice: Subject to any disclaimer, the term of this patent is extended or adjusted under 35 U.S.C. 154(b) by 128 days.

(21) Appl. No.: 15/420,236

(22) Filed: Jan. 31, 2017

(65) Prior Publication Data
US 2018/0215914 A1    Aug. 2, 2018

(51) Int. Cl.
C08L 67/04     (2006.01)
C08J 5/18      (2006.01)
B29B 9/06      (2006.01)
B29K 67/00     (2006.01)
B29L 7/00      (2006.01)
B29B 9/14      (2006.01)

(52) U.S. Cl.
CPC ............... *C08L 67/04* (2013.01); *C08J 5/18* (2013.01); *B29B 9/06* (2013.01); *B29B 9/14* (2013.01); *B29K 2067/046* (2013.01); *B29K 2995/006* (2013.01); *B29L 2007/002* (2013.01); *C08J 2367/04* (2013.01); *C08J 2431/04* (2013.01); *C08J 2467/04* (2013.01); *C08L 2201/06* (2013.01); *C08L 2203/16* (2013.01); *C08L 2205/025* (2013.01); *C08L 2205/03* (2013.01)

(58) Field of Classification Search
CPC ................................ C08L 67/04; D21H 13/24
See application file for complete search history.

(56) References Cited

U.S. PATENT DOCUMENTS

2007/0043434 A1*  2/2007  Meerkin .................. A61F 2/82
                                                      623/1.49

* cited by examiner

*Primary Examiner* — Kuo Liang Peng
(74) *Attorney, Agent, or Firm* — John D. Fado; Robert D. Jones

(57) ABSTRACT

L-Polylactic acid and D-Polylactic acid biodegradable biopolymers are combined with torrefied biomass and a plasticizer to create a biodegradable cardstock composition. The biodegradable cardstock composition provides an alternative to conventional plastic cardstocks, which are manufactured using petroleum-based materials such polyvinyl chloride (PVC) or polystyrene (PS). The biodegradable cardstock described herein can be incorporated into a variety of end products such as key cards, driver licenses, security badges, calling cards, and other plastic cards, including those that have a magnetic strip containing stored data such as credit and debit cards.

19 Claims, No Drawings

BIODEGRABLE CARDSTOCK COMPOSITION

FIELD OF THE INVENTION

The disclosed method and composition relates to biodegradable plastics. Specifically, the method and composition described herein relates to a biodegradable cardstock composition comprising a mixture of polylactic acid biopolymers, a plasticizer, and torrefied biomass.

BACKGROUND OF THE INVENTION

During the past several decades, plastics have replaced many traditional materials. Among other things, plastics are prevalent in the cardstock industry—which includes articles such as book covers, posters, identification cards and driver's licenses, hotel room keys, gift cards, credit cards and the like. Currently, cardstock articles are primarily made of polyvinyl chloride (PVC) or polyvinyl chloride derivatives. PVC is intrinsically rigid but can be used to form flexible articles through plasticization using phthalates. PVC also possesses excellent mechanical properties and heat resistance.

Despite its attractive properties, PVC is not perceived as eco-friendly. It does not biodegrade readily, is not derived from renewable feedstock, and has no established recycling stream. Furthermore, PVC compositions often release toxic chemicals into the environment, such as phthalates, oligomers, hydrochloric acid or even unreacted monomers. Further, PVC and polystyrene (PS) are made from crude oil and thus are (1) not sustainable and (2) subject to price fluctuations. Since a recycling program has not been established for these types of plastic articles, they are becoming non-degradable wastes, often ending up in landfills or as unsightly litter in the environment.

Many municipalities are currently seeking to ban these rigid plastics (PVC and PS) and consequently there is a strong incentive to find "green" alternatives from renewable resources that are biodegradable and compostable. Several research groups have created cardstock formulations that are biodegradable and compostable, however these formulations are typically brittle and distort when subjected to even low heat.

In U.S. Pat. No. 8,604,123 to Weismann (hereinafter "Weismann"), Weismann formulates a biodegradable polymer composition using the filler calcium carbonate with PLA as a base resin. The polymer formulation is stated to have a heat resistance of 150-250° F. (65.5-121° C.), but Weismann does not disclose supporting data, and the disclosed chemistry does not appear to support Weismann's claim. Those who are skilled in the polymer arts understand that the use of a filler such as calcium carbonate would not have the effect on the heat distortion temperature that Weismann claims. Thus it is not clear to what extent this technology overcomes the inherently poor heat resistant properties evident in past PLA formulations.

In U.S. Pat. No. 6,096,431 to Matsudaira (hereinafter "Matsudaira"), Matsudaira creates a biaxially oriented sheet comprised of polylactic acid (PLA). Matsudaira claims properties close to polyethylene terephthalate (PET) resin sheets and a degradable substrate. However, left in activated sludge, only a slight decrease in weight and mechanical strength was observed. Significantly, the problem with low degradation remains an issue.

The need exists for a cardstock composition made from renewable resources that has an improved heat distortion temperature and is degradable and compostable. Since most cardstock is manufactured using petroleum-based materials such PVC or PS, using renewable biodegradable plastic (specifically PLA) provides environmental advantages. An environmentally-friendly cardstock can be incorporated into a variety of cardstock end products, including products that have a magnetic strip containing stored data. In the current disclosure, the inventors describe a degradable and compostable cardstock comprising a mixture of biodegradable biopolymers, a torrefied biomass component, and a plasticizer. The aforementioned degradable and compostable cardstock in this disclosure was then compared to a commercially available credit card material comprised predominately of PVC.

SUMMARY OF THE INVENTION

This disclosure is directed to a biodegradable cardstock composition comprising L-PLA and D-PLA biodegradable biopolymers. The L-PLA and D-PLA biopolymers form a stereocomplex, which is added to torrefied biomass and, with a plasticizer, forms the biodegradable cardstock composition.

The disclosure is also directed to a method of making a biodegradable cardstock. In accordance with the method, a mixture of L-Polylactic acid biodegradable biopolymer, and D-Polylactic acid biodegradable biopolymer is created so that the mixture forms a stereocomplex. Torrefied biomass, and a plasticizer are also added to the mixture. The mixture is deposited into a co-rotating twin-screw extruder so that an extrudate is created. The extrudate is then pelletized and passed through a two-roll mill heated to 170° C. and then sheeted out to 0.75 mm thick films.

DETAILED DESCRIPTION OF PREFERRED EMBODIMENTS

Disclosed herein is a cardstock composition that provides an alternative to conventional plastic cardstocks from petroleum-based materials such polyvinyl chloride (PVC) or polystyrene (PS). This novel cardstock formulation can be incorporated into a variety of end products such as book covers, key cards, driver licenses, security badges, calling cards, and other plastic cards, including those that have a magnetic strip containing stored data. The composition is comprised of: (1) L-PLA, a biobased biodegradable polymer, (2) D-PLA, the enantiomeric isomer of L-PLA which forms a stereocomplex with L-PLA, and (3) torrefied biomass and (4) a plasticizer.

The use of the term "biodegradable cardstock" in this context means cardstock that can be converted to a degraded biomass, $CO_2$, and water through a thermochemical degradation process in a relatively short time, usually within a span of 4-6 months and definitely less than one year. "Biodegradable cardstock" meets ASTM (e.g. D6400) or ISO standards for biodegradation in specific environments, such as (but not limited to) industrial compost or marine environments. The thermochemical process involves the presence of above ambient temperatures, microorganisms, and aerobic conditions.

The use of the term "biodegradable biopolymer" in this context means polymers that can be converted to biomass, $CO_2$, and water through a thermochemical degradation process in a relatively short time, usually within a span of 4-6 months and definitely less than one year. Biodegradable polymers meet ASTM (e.g. D6400) or ISO standards for biodegradation in specific environments, such as (but not limited to) industrial compost or marine environments.

The thermochemical degradation process involves the presence of above ambient temperatures, microorganisms, and aerobic conditions. As a result of the thermochemical degradation process, biodegradable polymers generally exhibit loss in properties that can be quantified by standard tests. These types of biodegradable polymers can include (but are not limited to) polyhydroxyalkanoates, which include (but are not limited to) polyhydroxybutyrates, poly (hydroxybutyrates-co-valerates), polylactides, and polylactic acids.

"Stereocomplexation" is defined as a way to stabilize PLA semi-crystalline formulations by taking advantage of the unique crystal structure obtained by blending the two stereo enantiomeric polymers of lactic acid (L-PLA and D-PLA). Lactic acid monomers exist in two enantiomeric forms—L-lactic acid and D-lactic acid. Altering the ratio of L-lactic acid and D-Lactic acid in a Polylactic acid (PLA) polymer alters the crystallization of that PLA polymer. Increasing the amount of D-Lactic acid in the polymer matrix (up to a 50:50 mixture of the enantiomers) decreases the total crystallization and creates an amorphous polymer whose physical properties are controlled by the glass transition of polymer, which is between 45-70° C. depending on the total ratio of the two enantiomers. On the other hand, if one polymerizes pure enantiomeric polymers, pure L-PLA and/or pure D-PLA and blends these pure L-PLA and Pure D-PLA, the crystals that form during the blending process are helical and the melting temperature of the blend is up to 100° C. higher than the melting temperature of either of the pure enantiomeric PLA polymers. In addition to an increase in the melting temperature of the resulting polymer blend, there is an improvement of physical and mechanical properties over the L-PLA and D-PLA polymers alone.

The racemic mixture (50:50) of L-PLA and D-PLA has the highest stereochemistry structure with a melting temperature significantly higher than either of the enantiomers (250° C. for the stereocomplex versus 150-190° C. for the L-PLA or the D- PLA). Including a blend of L-PLA and D-PLA enantiomers into cardstock formulations results in improved heat distortion temperature and improved mechanical properties.

The use of the term "torrefied biomass" in this context means the addition of plant-based material generally rich in the lignocellulosic material; cellulose, lignin and hemicellulose that has been heat processed in an inert environment (very low oxygen environment). It can also mean organic residues obtained from harvesting and processing of agricultural crops. Examples of cellulosic filler can include but are not limited to fibers from native sources such as rice straw, wheat straw, cotton, corn stover, sorghum, yellow pine, almond hulls, other agricultural residue and forest litter. Cellulosic fillers can also be comprised of fibers obtained from torrefaction of native plant-based materials including fibers.

The use of the term "torrefaction" in this context means pyrolysis of plant-based material at temperatures between 200 to about 350° C. in an oxygen-free atmosphere. Torrefaction is a main pretreatment technology for improving the properties of agricultural biomass in order to deal with such problems such as high bulk volume, high moisture content and poor grindability. It has been shown that temperatures strongly affect the torrefied biomass and the type of feedstock also influences the conversion rate due to the different volatile content in raw biomass. An increase of torrefaction temperature leads to a decrease in solid bio-char yield and an increasing yield in the volatile matters including liquid and non-condensable gases.

The use of the term "plasticizer" in this context means a low molecular weight chemical additive including short-chain polymers that can disrupt polymer-polymer chain bonding or crystallization. Plasticizers provide more mobility for the macromolecules, resulting in a more easily deformable mass. Plasticizers can decrease the modulus, tensile strength, and glass transition temperature of a polymer, while simultaneously increasing the polymer's flexibility and elongation at break.

Increasing a polymer's melting temperature generally equates with a material that has a higher use temperature due to an increase in crystallization. This increased crystallization stiffens the material and thus it has greater resistance to the kinetic movement due to heat energy. An unintended consequence of increased crystallization however is material brittleness. By contrast a plasticizer inhibits crystallization and as a result decreases brittleness, but also reduces the heat distortion temperature of the material. The use of the stereocomplex in the present invention with a plasticizer has the opposite effect. The stereocomplex increases the crystallization thus increasing the melting temperature of the PLA material to over 200° C., but the plasticizer in this instance reduces brittleness of the PLA material without lowering the heat distortion temperature—which is a significant and an unexpected/surprising result. Furthermore, the stereocomplex in addition to adding to the total crystallization nucleates the crystallization of the material as a whole.

The use of the term "heat distortion temperature" and "heat deflection temperature" in this context, means the Vicat distortion temperature as related to ASTM methods such as ASTM D6400 or an increase in the response temperature as seen using TMA and DMTA techniques.

An embodiment of the invention is the composition comprised of the biodegradable polymer PLA, a polymer that is readily converted to biomass, $CO_2$, and water through a biochemical/thermochemical process in a short time, usually within a span of 4-6 months in a well-designed composting facility, for example.

One embodiment of the invention is a composition comprised of a biodegradable polymer having an average molecular weight between 10,000 and 500,000 Daltons, preferably in the range of 90,000 to 200,000 Daltons. An alternative embodiment of the invention is the composition comprised of a biodegradable polymer comprising from about 20 to 80 percent of the total weight of the composition. A further embodiment of the invention is a composition containing a nucleating agent comprising minerals, clays, salts, which include but are not limited to talc, calcium carbonate, organoclays, and phosphate salts.

An additional embodiment of the invention is a composition containing a stereocomplex that is formed when D-PLA is melt blended into the L-PLA matrix at a concentration between 1 and 50% D-PLA A further embodiment of the invention is a composition comprised of a stereocomplex made by the addition of D-PLA that is comprised of D-lactyl monomeric units. The D-PLA can be made through the ring opening polymerization of D-lactide. A monofunctional or multifunctional alcohol and an organometallic catalyst such as organotin compounds that initiates the reaction.

Another embodiment of the invention is a composition containing a stereocomplex made by the addition of D-PLA to an L-PLA matrix, the D-PLA, which has a number average molecular weight of 5,000 to 100,000 Daltons, preferably between 10,000 and 50,000 Daltons. Another embodiment of the invention comprises a D-PLA which has a melting temperature curve in the range of 150° C. to 200° C., preferably in between 165° C. to 195° C.

A further embodiment of the invention is a composition comprising D-PLA to an L-PLA matrix, the D-PLA comprising from about 5 to 20 percent of the total weight of the composition.

An embodiment of the invention is a composition comprising a cellulosic biomass, which includes but is not limited to fibers from native sources such as rice straw, wheat straw, cotton, corn stover, sorghum, yellow pine, almond hulls, walnut shells, sawdust, or other agricultural residue and/or forest litter.

An additional embodiment of the invention is a composition comprising a cellulosic biomass, which also includes but is not limited to torrefied fibers, which are produced through torrefaction. Cellulosic fibers undergo pyrolysis in temperatures from 200 to about 300 degrees Celsius under non-oxygenated conditions.

An embodiment of the invention is the composition comprising a cellulosic fiber, which has a particle size between 100 to about 1000 microns, preferably from 100 to about 500 microns.

An embodiment of the invention is a composition comprising a cellulosic fiber comprising from about 5 to 20 percent by weight of the total weight of the composition.

An embodiment of the invention is a composition containing a plasticizer comprising polymers with glass transition temperatures between 0 to 20 degrees Celsius. These polymers can include but are not limited to polybutylene succinates, poly(butylene-adipate-terephthalate), polyethylene glycol, and poly(ethylene-vinyl acetate).

An embodiment of the invention is a composition containing a plasticizer comprising a low molecular weight species, which can include but is not limited to citrate esters, tall oil, long chain fatty acids and esters, low molecular weight polymeric resins, oils or fatty acids.

An embodiment of the invention is a composition comprising a plasticizer comprising from about 5 to 20 percent by weight of the total weight of the composition.

Another embodiment of the invention is a composition is used to make articles, such as but not limited to printable cardstock, key cards, or sheets.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The invention is further illustrated by the following non-limiting Examples.

EXAMPLES

The polymer blends described herein can be made using techniques well known in the art. One understands that variations to these examples can be made by those trained in the art, but do not detract from the nature of the invention. Prior to compounding, the polymers in the following examples were dried at 85° C. overnight in a convection oven. The polymer blends were prepared with a co-rotating twin-screw extruder, which has six heating zones. The temperatures used for blending ranged from 160-190° C. The resulting blend was pelletized, fed into a two-mill at 170° C., and then sheeted out to a thickness of 0.75 mm. The heat deflection temperature of the samples were obtained from a Vicat instrument with a load of 10 N. Tensile properties of each sample were measured using an Instron universal testing system equipped with a 1 kN load cell. Impact strength was measured with an Izod impact tester. The polymer blends were compared to a commercially available credit card comprised predominately of PVC.

Example 1

A 500 gram sample comprised of 62% PLA 4032D, 15.5% Lapol HDT, 12.5% Vinnex 2504, and 10% Talc 609 was fed into a co-rotating twin-screw extruder. The temperature of the six heating zones were as follows: 168, 173, 178, 185, 183, 183° C. from feed to die. After pelletizing the strands, the resulting blend was fed into a two-roll mill at 170° C. The Vicat test result was 151° C. The tensile modulus and impact strength of the blend was 3829 MPa and 57 kJ/m$^2$, respectively. For comparison, the tensile modulus and Vicat heat deflection temperature of a commercially available credit card comprised predominately of PVC are 1551 MPa and 75° C., respectively.

Example 2

A 500 gram sample comprised of 58% PLA 4032D, 14.5% Lapol HDT, 12.5% Vinnex 2504, 5% Vinnex 2505, and 10% Talc 609 was fed into a co-rotating twin-screw extruder. The temperature of the six heating zones were as follows: 168, 173, 178, 185, 183, 183° C. from feed to die. After pelletizing the strands, the resulting blend was fed into a two-roll mill at 170° C. The Vicat test result was 145° C. The tensile modulus is around 4039 MPa. For comparison, the tensile modulus and Vicat heat deflection temperature of a commercially available credit card comprised predominately of PVC are 1551 MPa and 75° C., respectively.

Example 3

A 500 gram sample comprised of 65% PLA 4032D, 15% Torrefied biomass and 20% Lapol HDT was fed into a co-rotating twin-screw extruder. The temperature of the six heating zones were as follows: 168, 173, 178, 185, 183, 183° C. from feed to die. After pelletizing the strands, the resulting blend was fed into a two-roll mill at 170° C. The heat deflection temperature as measured using TMA analysis was 175° C. The tensile modulus was 4800 MPa. For comparison, the tensile modulus and Vicat heat deflection temperature of a commercially available credit card comprised predominately of PVC are 1551 MPa and 75° C., respectively.

Example 4

A 500 gram sample comprised of 50% PLA 4032D, 30% Torrefied Biomass, and 20% Lapol HDT was fed into a co-rotating twin-screw extruder. The temperature of the six heating zones were as follows: 168, 173, 178, 185, 183, 183° C. from feed to die. After pelletizing the strands, the resulting blend was fed into a two-roll mill at 170° C. The heat deflection temperature as measured using TMA analysis was 200° C. The tensile modulus was 5000 MPa. For comparison, the tensile modulus and Vicat heat deflection temperature of a commercially available credit card comprised predominately of PVC are 1551 MPa and 75° C., respectively.

For the foregoing reasons, it is clear that the composition described herein provides an innovative cardstock material that is biodegradable and compostable. The current material may be modified in multiple ways and applied in various technological applications. Although the materials of construction are generally described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

The invention claimed is:

1. A biodegradable cardstock composition comprising:
a) L-Polylactic acid biodegradable biopolymer;
b) D-Polylactic acid biodegradable biopolymer, the D-Polylactic acid forming a stereocomplex with the L-Polylactic acid;
c) torrefied biomass; and,
d) a plasticizer
wherein the L-Polylactic acid, the D-Polylactic acid, the torrefied biomass, and the plasticizer are compounded to create the biodegradable cardstock composition.

2. The composition of claim 1, wherein the biodegradable polymers have an average molecular weight of 10,000 to 500,000 Daltons.

3. The composition of claim 1, wherein the biodegradable biopolymers comprise 20 to about 80 percent of the total weight of the composition.

4. The composition of claim 1, wherein D-Polylactic acid will form a stereocomplex when melt blended with L-Polylactic acid matrix.

5. The composition of claim 1, wherein D-Polylactic acid is a polyester comprised of D-lactyl monomeric units.

6. The composition of claim 1, wherein D-Polylactic acid is made through the ring opening polymerization of D-lactide, initiated with a monofunctional or multifunctional alcohol and an organometallic catalyst.

7. The composition of claim 1, wherein D-Polylactic acid is a polyester, which has a number average molecular weight of 5,000 to 100,000 Daltons.

8. The composition of claim 1, wherein D-Polylactic acid is a polyester, which has a number average molecular weight of between 10,000 and 50,000 Daltons.

9. The composition of claim 1, wherein the D-Polylactic acid is a polyester which has a melting temperature curve in the range of 150° C. to 200° C.

10. The composition of claim 1, wherein the D-Polylactic acid is a polyester which has a melting temperature curve in the range of 165° C. to 195° C.

11. The composition of claim 1, wherein the composition is comprised of 5 to 20 percent by weight of the D-Polylactic acid.

12. The composition of claim 1, wherein the torrefied biomass is comprised of cellulosic fibers, which include rice straw, wheat straw, cotton, corn stover, sorghum, yellow pine, almond hulls, spent mushroom compost and other agricultural residue and forest litter.

13. The composition of claim 1, wherein the torrefied biomass is comprised of torrefied fibers, which are produced upon heating cellulose fibers between 200 to 300 degrees Celsius under an inert atmosphere.

14. The composition of claim 1, wherein the torrefied biomass that has a particle size between 10 to about 1000 microns.

15. The composition of claim 1, wherein the composition is comprised from up to 20 percent by weight of torrefied biomass.

16. The composition of claim 1, wherein the plasticizer is comprised of polybutylene succinates, poly(butylene-adipate-terephthalate), poly(ethylene-vinyl acetate) or mixtures of these.

17. The composition of claim 1, wherein the plasticizer has a glass transition temperatures from −20 to 20 degrees Celsius.

18. The composition of claim 1, wherein the composition is comprised of about 5 to 20 percent by weight of the plasticizer.

19. The composition according to claim 1, wherein the composition may comprise printable cardstock, key cards, or sheets with and without a magnetic readable strip.

* * * * *